Feb. 9, 1960   E. J. POLTORAK ET AL   2,924,471
GASKETS
Filed June 24, 1954

INVENTORS.
EMIL J. POLTORAK
WALTER M. DE WITT SR.
BY Virgil C. Kline
ATTORNEY:

United States Patent Office 2,924,471
Patented Feb. 9, 1960

---

2,924,471

GASKETS

Emil J. Poltorak and Walter M. De Witt, Sr., Somerville, N.J., assignors to Johns-Manville Corporation, New York, N.Y., a corporation of New York Application June 24, 1954, Serial No. 438,997

10 Claims. (Cl. 288—10)

This invention relates to gaskets, and is particularly, though not exclusively, concerned with improvements in gaskets for high temperature service, especially such gaskets having a shape as generally illustrated in Edward J. Wirfs U.S. Patent No. 1,533,490, issued April 14, 1925.

Various attempts have been made to develop gaskets having the properties requisite for high temperature service and resistance to corrosion by fluids and gases, but known gaskets for this purpose have not generally exhibited the desired combined properties of ready compressibility under light sealing forces, good sealing effectiveness, over a long service life, flexibility, and good resilience or tendency to recover from compression loads.

Accordingly, it is an object of the instant invention to provide a gasket which is more readily compressed than those previously known, which seals better, which is flexible and better able to follow the relative motion of the surfaces to be sealed, and which at the same time has a high degree of resilience.

A further object of the invention is to provide such a gasket having good heat resistance and corrosion resistance and capable of retaining its sealing effectiveness over a long service life.

Broadly, our invention comprises gasketing having a strip of fabric knitted from metallic strands rolled laterally, in relatively loose fashion, into superposed convolutions, to form a center, about which is applied a jacket comprising at least one layer of fabric also knitted from metallic strands. This center and jacket or jackets comprise a core about which is applied a cover comprising at least one layer of fabric knitted from metallic strands and coated on its outer surface with an elastomer in which the fabric is at least partially embedded, and to which it is bonded. The invention resides in part in the construction of the core, and in part in the novel cover, but especially in the combination of the two. In more particular aspects, the invention comprises the crimping of the center strip and the use of metallic strands in the knitted metal mesh components having initial diameters falling within certain size ranges, and knitted so that the several metal mesh components have each a number of courses per inch falling within a certain range.

The nature of the invention, and other objects thereof, and the manner of accomplishing the various objects, will be more clearly understood from the following detailed description, taken in connection with the accompanying drawing, in which.

Figure 4:
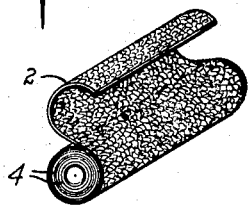
Fig. 4 is a perspective view showing how such a knitted metal fabric may be rolled upon itself to form the center, the convolutions being shown schematically.
Figures 9, 10:

Fig. 9 is a plan view showing details of a piece of knitted metal mesh fabric such as may be employed in forming the roll of fabric illustrated in Fig. 4; and Fig. 10 is a side elevational view, with a portion taken in section on a longitudinal axis, showing the relationship of crimps in successive convolutions of a roll of knitted fabric formed as in Fig. 4, from knitted fabric illustrated in more detail in Fig. 9.

Figure 1:
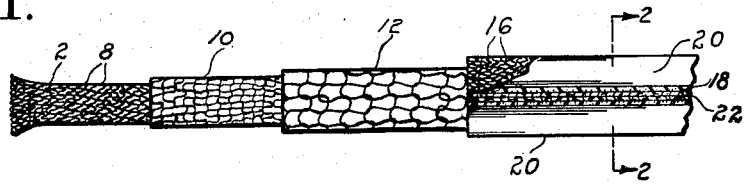
Fig. 1 is an elevation showing a portion of a novel gasket, with certain elements broken away and with others shown in section.
Figure 2:
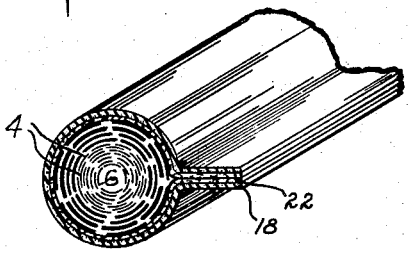
Fig. 2 is a perspective view of the gasket of Fig. 1, taken on the section line 2—2 and looking in the direction of the arrows, but showing the core elements schematically.
Figure 3:
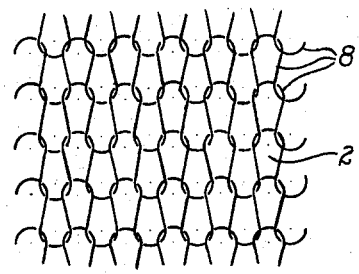
Fig. 3 is a detail plan view on an enlarged scale, illustrating a knitted metal fabric such as employed in the core and cover.

In accordance with the invention, a strip of knitted metal mesh fabric 2, of suitable width, depending upon the diameter of the gasket core to be formed, is rolled laterally into superposed convolutions 4 to form a center 6 for the gasket core. The strip of fabric knitted from metallic strands may be cut from a tubular knitted metal mesh stocking, as produced by conventional knitting machinery employed in the metal textile industry, the stocking being flattened, so that the strip as employed desirably, but not necessarily, comprises two layers of the fabric. It is preferable to crimp the strip before rolling it into the convoluted form. Very effective results are obtained by crimping the fabric strip lightly diagonally of the strip, in a manner difficult to show, but intended to be illustrated by the wavy lines depicting certain of the strands of the fabric 2 in Fig. 1, and illustrated in more detail in Fig. 9, and by not rolling the strip too tightly, so that the convolutions are relatively loosely related, with at least some of the crimps of successive convolutions interlocking that is, registering or nesting, as illustrated, for example, in Fig. 10, so as to lock the layers against undue shifting relative to each other, while at the same time providing an open and readily compressible, yet resilient core. If desired, the central opening of the center 6 of the described construction may be filled by rolling within it one or more such centers, or by using a wider center strip and additional convolutions thereof, with certain advantages and disadvantages hereinafter pointed out.

The metallic strands 8 employed in the fabric 2 are preferably knitted about 8–20 courses per inch, and have an initial diameter within the range of about .003–.008 inch. The terminology, "initial diameter," is used in this application as an inclusive term to identify not only strands having a circular cross-section, but also strands having initially a circular cross-section but which may have been flattened or otherwise distorted in cross-sectional shape as employed in the various components of the gaskets.

Surrounding the center formed as described above, is a jacket comprising at least one layer of fabric knitted from metallic strands. Conveniently, the jacket comprises a tubular knitted metallic mesh stocking as shown at 10 having its inner surface in contact with the center and holding it under relatively light compression in its convoluted form. Preferably, a plurality of such jackets are applied, one over the other and in relatively light compressive contact with each other. One such additional jacket is illustrated at 12. For successful results, the strands employed in the jacket or jackets should be knitted about 4–12 courses per inch, and should have an initial diameter within the range of about .004–.020 inch. Effective results have been obtained by employing somewhat coarser strands and a more open knit in the outer jacket 12 than in the inner jacket 10 as illustrated, but this is not necessary, so long as the stated ranges of strand size and number of courses per inch are satisfied. In general, it is preferred that the jackets 10, 12, in a given gasket, be knitted from heavier gauge wire, and with a coarser mesh, than the fabric 2 forming the center strip 6.

Figs. 5–8 illustrate two forms of cover which may be applied over the gasket core as described above in accordance with the invention. The cover as exemplified in Figs. 6 and 7 comprises at least one layer of fabric 14 knitted from metallic strands 16, about 7–18 courses per inch, having an initial diameter within the range of about .004–.015 inch. This fabric may conveniently be formed by cutting a strip from a flattened, tubular, knitted metal mesh stocking, as produced by conventional knitting machinery employed in the metal textile industry, so that the metal mesh is present in two layers, or a single layer is sufficient. This fabric strip is calender-coated or otherwise coated with an elastomer 18, preferably a heat and corrosion-resistant elastomer such as a flame-resistant neoprene compound or silicone compound. As illustrated, the metal mesh has been calender-coated, the elastomer having struck through the mesh so as to partially embed it therein and to hold it in bonded relation therewith, portions of the metal being visible at one face of the compound as illustrated at 16′. When applied to the gasket core comprising the center and jackets as hereinbefore described, the cover is wrapped relatively loosely upon the core, in light contact therewith, with the surface 19 of the cover, exhibiting the metal strands, turned inwardly, and with the surface 20, exhibiting only the elastomer, forming the outside surface of the gasket. Preferably, the cover is formed with overlapping flanges to form a gasket of the shape indicated generally in the said Wirfs' Patent No. 1,533,490. The overlapping flange portions may be secured together by using a suitable cement, or may be sewed or stapled in conventional fashion.

Figure 5:
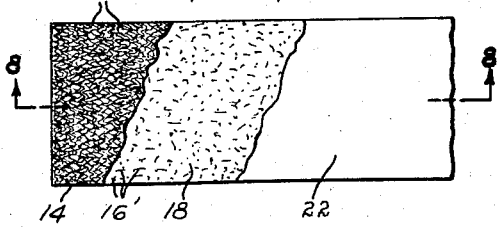
Fig. 5 is a plan view of the cover material illustrated in Fig. 1, with certain layers thereof broken away in part.
Figure 6:
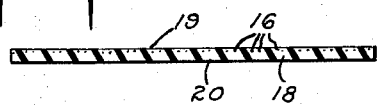
Fig. 6 is a sectional view, taken on the line 6—6 of Fig. 7, of a modified form of cover.
Figure 7:
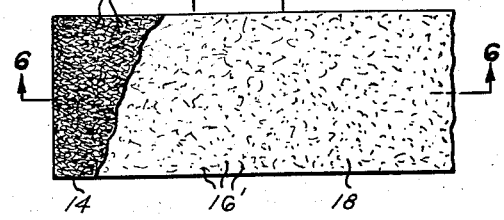
Fig. 7 is a plan view of the cover material of Fig. 6, with a portion of a coating layer broken away.
Figure 8:
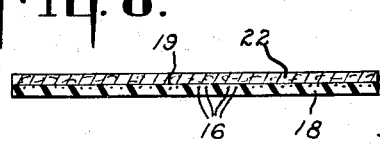
Fig. 8 is a sectional view, taken on the line 8—8, showing the layers of material comprising the cover illustrated in Fig. 5.

The form of cover illustrated in Figs. 5 and 8 is formed as described in connection with Figs. 6 and 7, but includes further a layer of non-metallic fabric 22 such as glass, asbestos, Orlon, and the like, applied to one surface thereof. As applied to the gasket core, the non-metallic fabric is disposed inwardly, and the surface provided by the elastomer alone forms the outer surface. It will therefore be clear that the layer of non-metallic fabric, as applied to the cover strip shown in Figs. 6 and 7 should be placed upon that surface (19) of the strip at which the portions of the metal mesh are visible, as will be apparent from Figs. 5 and 8. In the illustrated arrangement, the elastomer forming the outside coating extends through the openings of the knitted metallic fabric and into bonding contact with the non-metallic fabric.

By forming the gasket center of knitted metal mesh having an initial strand diameter and number of courses per inch within the ranges stated, with the convolutions relatively loosely formed upon each other as described, there results a light and flexible, readily compressible center, having excellent recovery characteristics after compression. The lightness, compressibility, and resilience or recovery characteristics of the center are materially improved by crimping the center strip as described. If the center strip is wrapped more tightly upon itself and so as not to leave a central aperture in the convolute form, an increase in fire-resistance and resilience is obtained, but the construction of the center in this alternative fashion results in the loss of a certain amount of the highly desired ready initial compressibility. The use of a knitted metal mesh jacket on the center as described, and particularly a plurality of such jackets, greatly enhances the resilience of the gasket. These jackets, formed generally of a heavier gauge wire and knitted more coarsely than the center strip, in fact contribute much of the resilience to the gasket, without detracting adversely from its flexibility.

The forms of cover material described above may be employed with particular advantage in the gaskets of the instant invention because of their high flexibility, toughness, resilience, and their excellent sealing properties. The use of the knitted metallic fabric in the cover material is especially important as insuring flexibility and durability. A woven metallic fabric will not produce the same results, especially with respect to flexibility and resilience, as produced by the knitted metallic fabric. The use of a glass, asbestos, or other non-metallic fabric as a backing for the elastomer-coated metal mesh may be desirable in some situations, as where the elastomer itself does not have a high heat or flame resistance and is subject to rather rapid deterioration under those conditions of service. However, the use of the layer of non-metallic fabric reduces the resilience and ease of compression to some extent. The metals employed for the knitted fabrics in the center, the jackets, and the cover are preferably Inconel, Monel, or stainless steel, i.e., metals or metal alloys having the properties of good heat and corrosion resistance, as well as being relatively tough, hard, and flexible.

By combining a gasket core of the type described with a cover material such as described, a gasket having outstanding characteristics or properties of ready compressibility under light sealing forces, good sealing effectiveness over a long service life, high flexibility, and resilience have been obtained. By the proper selection of metals or metallic alloys for the metal mesh components, and of the elastomer for the cover coating, the properties of sealability, resilience, and heat and corosion-resistance can be clearly enhanced.

Gaskets made in accordance with the instant invention exhibit in particular a very marked superiority over known commercial gaskets of the same general type with respect to easy sealability or lightness of the load required to effect an initial seal. Thus, whereas the known gaskets require an average of 25–40 pounds per inch of length, in standard thicknesses, to effect a 40% compression, novel gaskets made in accordance with our invention can be compressed to the same extent with a force averaging only 10 pounds per inch of length, all thicknesses, without sacrifice of excellent recovery characteristics.

Having thus described our invention in rather full detail, it will be understood that these details need not be strictly adhered to but that various changes and modifications may suggest themselves to one skilled in the art, all falling within the scope of the invention as defined by the subjoined claims.

What we claim is:

1. A flexible, readily compressible, resilient gasket comprising, a knitted mesh of relatively hard and flexible metal strands, about 8–20 courses per inch, said strands having an initial diameter within the range of about .003–.008 inch, said mesh being arranged in superposed convolutions forming a relatively soft, readily compressible, and resilient center for said gasket, and a jacket surrounding said center comprising at least one layer of a knitted mesh of relatively hard and flexible metal strands, about 4–12 courses per inch, having an initial diameter within the range of about .004–.020 inch, the initial diameter of the metal strands in said jacket being greater than that of the metal strands in said center, the mesh formed by the latter strands having the closer knit, said jacket enhancing the resilience of the readily compressible gasket.

2. A gasket as defined in claim 1, in which said jacket comprises a plurality of superposed layers of the defined jacket mesh.

3. A gasket as defined in claim 1, and a flexible cover surrounding said jacket comprising at least one layer of knitted mesh of metal strands, about 7–18 courses per inch, having an initial diameter within the range .004–

.015 inch, said cover fabric having on at least its outer surface an elastomeric coating and being at least partially embedded in said coating and bonded thereto.

4. A gasket as defined in claim 3, in which said cover comprises further at least one layer of a non-metallic textile fabric on the inner side thereof, said coating extending through the openings of said knitted metallic cover fabric and into contact with said non-metallic textile fabric and being in bonded relation therewith.

5. A flexible, readily compressible, resilient gasket comprising, a comparatively finely knitted mesh of relatively hard and flexible metal strands of comparatively fine gauge, said mesh being arranged in convolutions forming a center for said gasket, said mesh being crimped, the crimps enhancing the open nature, lightness, and compressibility of said center while imparting resilience thereto, and a jacket surrounding said center comprising at least one layer of knitted mesh of relatively hard and flexible metal strands of heavier gauge and coarser knit than the strands of said center, said jacket enhancing the resilience of the readily compressible gasket.

6. A gasket as defined in claim 5, in which at least some of the crimps of successive convolutions are inter-engaged in at least partial nesting relationship, so as to restrain undue relative shifting of the convolutions.

7. A gasket as defined in claim 5, in which said crimps extend helically in the convoluted center.

8. A gasket as defined in claim 5, in which said jacket comprises a plurality of superposed layers of the defined jacket mesh.

9. A gasket as defined in claim 5, and a flexible cover surrounding said jacket comprising at least one layer of knitted mesh of metal strands, said cover mesh having on at least its outer surface an elastomeric coating and being at least partially embedded therein and bonded thereto, said cover comprising further at least one layer of a non-metallic textile fabric on the inner side thereof, said coating extending through the openings of said knitted metal cover mesh and into contact with said non-metallic textile fabric and being in bonded relation therewith.

10. A gasket as defined in claim 1, the mesh of said center being crimped, the crimps enhancing the open nature, lightness, and compressibility of said center while imparting resilience thereto, and a flexible cover surrounding said jacket comprising at least one layer of knitted mesh of metal strands, about 7–18 courses per inch, having an initial diameter within the range .004–.015 inch, said mesh having an elastomeric coating thereon and being at least partially embedded in said coating and in bonded relationship therewith.

References Cited in the file of this patent

UNITED STATES PATENTS

| | | |
|---|---|---|
| 1,225,286 | Sweetland | May 8, 1917 |
| 2,143,106 | Freedlander | Jan. 10, 1939 |
| 2,250,863 | Goodloe | July 29, 1941 |
| 2,329,994 | Kingman | Sept. 21, 1943 |
| 2,674,644 | Goodloe | Apr. 6, 1954 |
| 2,761,203 | De Witt | Sept. 4, 1956 |

FOREIGN PATENTS

| | | |
|---|---|---|
| 690,906 | Great Britain | Apr. 29, 1953 |